US010084756B2

(12) United States Patent
Tatlicioglu et al.

(10) Patent No.: US 10,084,756 B2
(45) Date of Patent: Sep. 25, 2018

(54) ANONYMOUS COMMUNICATIONS IN SOFTWARE-DEFINED NETWORKS VIA ROUTE HOPPING AND IP ADDRESS RANDOMIZATION

(71) Applicant: ARGELA YAZILIM VE BILISIM TEKNOLOJILERI SAN. VE TIC. A.S., Istanbul (TR)

(72) Inventors: Sinan Tatlicioglu, Istanbul (TR); Seyhan Civanlar, Istanbul (TR); Metin Balci, Istanbul (TR); Erhan Lokman, Istanbul (TR); Burak Gorkemli, Istanbul (TR); Bulent Kaytaz, Istanbul (TR)

(73) Assignee: ARGELA YAZILIM VE BILISIM TEKNOLOJILERI SAN. VE TIC. A.S. (TR)

( * ) Notice: Subject to any disclaimer, the term of this patent is extended or adjusted under 35 U.S.C. 154(b) by 167 days.

(21) Appl. No.: 14/984,954

(22) Filed: Dec. 30, 2015

(65) Prior Publication Data

US 2017/0195295 A1    Jul. 6, 2017

(51) Int. Cl.
*H04L 29/06* (2006.01)
*H04L 12/741* (2013.01)

(52) U.S. Cl.
CPC .......... *H04L 63/0414* (2013.01); *H04L 45/74* (2013.01)

(58) Field of Classification Search
CPC ..... H04L 63/0414; H04L 45/74; H04L 12/56; H04L 12/28; H04L 1/00; H04L 12/26
USPC ........ 726/3; 370/351, 395.53, 235, 401, 409
See application file for complete search history.

(56) References Cited

U.S. PATENT DOCUMENTS

| | | | | |
|---|---|---|---|---|
| 5,600,638 A | * | 2/1997 | Bertin | H04L 45/00 370/255 |
| 6,798,782 B1 | * | 9/2004 | Caronni | H04L 29/12009 370/409 |
| 7,542,476 B2 | * | 6/2009 | Almog | H04L 12/4679 370/401 |
| 8,462,794 B2 | * | 6/2013 | Dobbins | H04L 12/1886 370/395.2 |
| 2008/0107025 A1 | * | 5/2008 | Cho | H04L 43/16 370/235 |

* cited by examiner

*Primary Examiner* — Thanhnga B Truong
(74) *Attorney, Agent, or Firm* — IP Authority, LLC; Ramraj Soundararajan

(57) ABSTRACT

A system and method that rely on a centralized and trusted control mechanism for a software-defined network (SDN) to dynamically assign routes between two end points, and to simultaneously change their real IP addresses to fake IP addresses to establish short-lived obfuscated communications paths with a goal of preserving anonymity. The SDN controller determines the short-lived routes from a feasible route-set and new fake IP addresses from a reserved address pool for the source and destination hosts. It provisions only the switches along the route with rules so that a switch can forward packets of the data flow to another switch without needing to know the actual IP addresses of the communicating endpoints, and hence, providing strict anonymity even when the switches are compromised.

21 Claims, 11 Drawing Sheets

OPENFLOW COMPONENTS

| Rule (Criterion) | Action |
|---|---|
| Switch port | Forward to one or more ports |
| VLAN ID | Drop |
| VLAN PCP | Encapsulate and forward to controller |
| MAC Source Address | Send to normal processing pipeline |
| MAC Destination Address | Modify fields |
| Ethernet Type | |
| IP Source Address | |
| IP Destination Address | |
| IP ToS | |
| IP Protocol | |
| L4 Source Port | |
| L4 Destination Port | |

FIG. 1

| Fake IP Address | Status |
| --- | --- |
| Fake-IP1 (e.g., 124.34.56.78) | In Use |
| Fake-IP2 | In Use |
| Fake-IP3 | Reserved |
| ... | Unassigned |

FIG. 4

| Flow no | Source IP | Destination IP | Anonymous Route | Status |
|---|---|---|---|---|
| 1 | Real-IP(s) Fake-IP(s) | Real-IP(s) Fake=IP(d) | X1-Y2-L2-Z1 | Active |
| 2 | Real-IP(s) Fake-IP1(s) | Real-IP(s) Fake-IP1(d) | X1-Y3-L3-N3-Z3 | Reserved |
| 3 | ... | ... | ... | ... |

FIG. 5

ANONYMOUS COMMUNICATIONS IN SOFTWARE-DEFINED NETWORKS VIA ROUTE HOPPING AND IP ADDRESS RANDOMIZATION

BACKGROUND OF THE INVENTION

Field of Invention

The present invention relates generally to development of an application software for SDN networks, and more specifically, it relates to a software that utilizes SDN controller's trusted dynamic flow-routing and L3 header-rewrite capabilities in SDN networks. These capabilities are exploited to provide anonymous communications between a source and destination host pair.

Discussion of Related Art

Any discussion of the prior art throughout the specification should in no way be considered as an admission that such prior art is widely known or forms part of common general knowledge in the field.

Securing communications has always been a critical issue in computer networks. Computer networks use many intermediary switches to carry data packets to their final destinations. If any of these intermediary switches is compromised, the communications are jeopardized. The most basic and efficient method to secure any communications in prior art is encryption. Origination encrypts the data and the destination decrypts and reads it. Any intermediary can attempt to snoop into the data, but as long as the encryption keys are kept confidential, the data is kept safe, too. However, the identities of the source and destination are still exposed even though the content of the data is secured since two-way routing is performed in the network based on the network addresses of the source and destination. Given enough time a malicious party tapping into the network traffic can easily infer the identities of the source and destination, their communications frequency and volumes (even when the data is encrypted).

There are many cases in which simply securing the identities of the communicating parties, and thus keeping the conversation anonymous, is equally or even more important than securing the content of the communications. A prior art method called "onion routing" (see paper to Reed et al. titled, "Anonymous connections and onion routing," IEEE Journal on Selected Areas in Communications, 1998, 16(4), pp. 482-494) (named so because of its use of encryption layers analogous to layers of an onion) was developed in the mid-1990s at the U.S. Naval Research Laboratory to provide anonymous communications over computer networks. It was further developed by the Defense Advanced Research Projects Agency (DARPA) and patented by the Navy in 1998. In onion routing, the data is encapsulated in layers of encryption. Thereafter, the encrypted data is transmitted through a series of network switches, each of which peels away a single layer, thereby uncovers the data's next destination. After the final innermost layer is decrypted, the message is delivered to its destination. The communications is kept anonymous because each intermediary knows only the location of the immediately preceding and the following nodes.

Tor (see paper to Lawrence titled, "The Inside Story of Tor, the Best Internet Anonymity Tool the Government Ever Built," Business Week, Jan. 23, 2014), a free worldwide, volunteer network, is the most prominent and widely available application of onion routing. A client using some special software, which is usually a 'Tor browser', can communicate with a web server through the use of dedicated 'Tor switches'. A "directory node" provides the list of all available Tor switches. The Tor client software chooses a random path among the available switches and sends its encrypted data packets as in onion routing.

The Tor browsing is relatively slow when compared with traditional routing mechanisms. It requires a software installation at the client side and dedicated switches or volunteering participants before any communications becomes possible. Additionally, when the last encapsulation layer is stripped off at the egress node, which is well known to be a Tor switch and hence an attacking point, the content of the data becomes vulnerable to attacks. If by any means the egress Tor node is compromised, the data can be captured. In order to compensate for the said deficiency, the content of the data should also be encrypted using cryptographic methods such as TLS (see paper to Dierks et al. titled, "The TLS protocol, Version 1.0," January 1999, RFC-2246) or SSL, resulting in further sluggishness in communications.

Sophisticated attackers often spend a long time trying to map the target network and gather as much information as possible about essential services. Under the assumption that a determined attacker will get any information given enough time, keeping any information about the communications static does not make sense. The general defense strategy described in this patent application tries to render information obtained by attackers harmless by changing network related information frequently. As an added bonus, the use of stale information raises alerts, which can serve as valuable input to intrusion detection systems.

To maximize the defense, changes should be unpredictable for the attacker. Timeliness is a central aspect of this defense; on one hand, a high rate of change results in high overhead; on the other hand, infrequent change might allow an attacker to gather information and spoil anonymity. The strategy has to be flexible enough to allow one to describe this trade-off upon actual deployment. The strategy we mapped out in this invention is a dynamic address randomization and route hopping strategy, implemented in synchronization, during the lifetime of an anonymous communications session without creating disruption on the rest of the network. Of course the proposed strategy is practical only when there is a reasonably small set of communications that are deemed critical.

Considering the deficiencies of encryption and onion routing techniques, the new software proposed in our present invention departs from the conventional concepts and designs of prior art, and in doing so, it provides a much faster and more efficient way for anonymous delivery of any critical data.

We exploited key properties of a software defined network (SDN) (see paper to Lantz et al. titled, "A network in a laptop: rapid prototyping for software-defined networks," Proceedings of the $9^{th}$ ACM, 2010) to execute the proposed strategy without necessitating the use of encryption/decryption mechanisms. SDN relies on a trusted centralized system (i.e., the controller,) which oversees the network, and can instantly program the network switches along the data path using a trusted control network (e.g., using OpenFlow protocol (see paper to McKeown et al. titled, "OpenFlow: Enabling innovation in campus networks," ACM SIGCOMM Computer Communication Review, 38(2), April 2008, pp. 69-74). This unique infrastructure enables rapid programming of switches with aliased (fake) IP addresses for the source and destination hosts and dynamic route changes only for a set of flows without touching the rest of the traffic.

Embodiments of the present invention are an improvement over prior art systems and methods.

SUMMARY OF THE INVENTION

In one embodiment, the present invention provides a method to establish an anonymous path between a source and a destination in a software defined network (SDN) controller comprising: identifying a route for the anonymous path between the source and the destination, the route having an ingress switch associated with the source and an egress switch associated with the destination, and the route valid for a pre-determined time defined by a time to live (TTL) value; identifying a fake source address for the source and a fake destination address for the destination; sending instructions to the ingress switch to utilize the fake source address as the source IP address for the pre-determined time defined by the TTL value and sending instructions to the egress switch to utilize the fake destination address as the destination IP address for the pre-determined time defined by the TTL value, and wherein, for the pre-determined time period defined by the TTL value, the source and the destination communicate anonymously via the route by forwarding packets of data from the ingress switch to the egress switch based on the fake source address and fake destination address.

In another embodiment, the present invention provides for a non-transitory, computer accessible memory medium storing program instructions for performing a method to establish an anonymous path between a source and a destination in a software defined network (SDN) controller, wherein the program instructions are executable by a processor to: identify a route for the anonymous path between the source and the destination, the route having an ingress switch associated with the source and an egress switch associated with the destination, and the route valid for a pre-determined time defined by a time to live (TTL) value; identify a fake source address for the source and a fake destination address for the destination; send instructions to the ingress switch to utilize the fake source address as the source IP address for the pre-determined time defined by the TTL value and sending instructions to the egress switch to utilize the fake destination address as the destination IP address for the pre-determined time defined by the TTL value, and wherein, for the pre-determined time period defined by the TTL value, the source and the destination communicate anonymously via the route by forwarding packets of data from the ingress switch to the egress switch based on the fake source address and fake destination address.

In yet another embodiment, the present invention provides a system to establish an anonymous path between a source and a destination in comprising: an application software; a software defined network (SDN) controller; wherein the application software and SDN controller: identify a route for the anonymous path between the source and the destination, the route having an ingress switch associated with the source and an egress switch associated with the destination, and the route valid for a pre-determined time defined by a time to live (TTL) value; identify a fake source address for the source and a fake destination address for the destination; send instructions to the ingress switch to utilize the fake source address as the source IP address for the pre-determined time defined by the TTL value and sending instructions to the egress switch to utilize the fake destination address as the destination IP address for the pre-determined time defined by the TTL value, and wherein, for the pre-determined time period defined by the TTL value, the source and the destination communicate anonymously via the route by forwarding packets of data from the ingress switch to the egress switch based on the fake source address and fake destination address.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 1 illustrates OpenFlow operations.

FIG. 4 illustrates an Exemplary Fake IP Address Pool.

FIG. 5 illustrates an Exemplary set of anonymous paths in APE.

DESCRIPTION OF THE PREFERRED EMBODIMENTS

Figure 2:
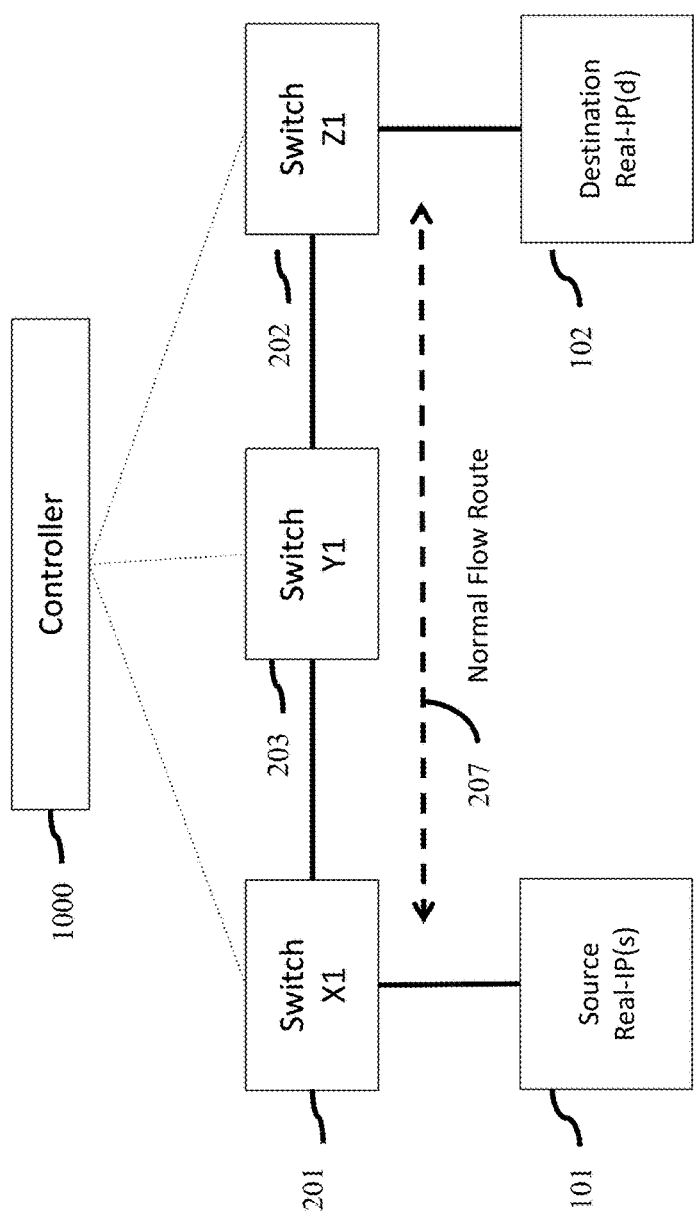
FIG. 2 illustrates a normal path between source and destination.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The general purpose of the present invention is to deliver any sensitive/critical data to its final destination in an anonymous way in a software-defined network (SDN). In order to do so the invention utilizes the idea of setting up an anonymous data path before starting the session of communications. The system and method of this invention relies on a centralized controller-driven mechanism to dynamically shuffle around the routing path between two communicating end points while changing aliased (fake) IP addresses corresponding to those end points for anonymity. As an adaptation of the Moving Target Defense (MTD) (see paper to Jafarian et al. titled, "OpenFlow Random Host Mutation: Transparent Moving Target Defense Using Software Defined Networks," HotSDN '12, Proceedings of the first workshop on hot topics in software defined networks, ACM SIGCOMM, pp. 127-132) mechanisms, this technique relies on SDN networks centralized route and IP address control mechanisms that is hardly available in the classical IP networks now. Basically, the controller periodically sends new instructions to switches to modify the route of the path between the ingress and egress switches and simultaneously assigns new alias IP addresses for end points. Route and alias IP address decay periods are governed by a Time to Live (TTL) parameter that is completely adjustable.

The fake IP addresses for the end points are selected from a reserved and unused address block, and assigned in a systematic (e.g., round robin) or random manner. The deprecated anonymous routes are instantly erased from the flow tables of switches to keep the flow table size manageable. Note that, by design, the flow table size is small, and therefore a valuable resource in switches. Such address and route randomizations not only maintain anonymity but also protect the communications path against typical man-in-the-middle attacks, target identification attacks, hotlist worms and many other malicious attempts towards a communication that is normally kept static, as a side benefit.

A key aspect of this invention is the obfuscation of the communications by shuffling the path from one group of switches to another. Although theoretically this technique is applicable to the entire network's traffic, we envisioned it to be applicable only to a small set of communications that is deemed critical. Doing so, the additional workload on the controller and the probable flow table explosion in the switches are kept at bare minimum.

The source (or destination) first makes an 'anonymous path request' to an intended destination address, through a software application that is an adjunct to the controller. From here onward this application will be named "Anonymous Path Executor (APE)". The source and destination IP addresses for which anonymous communications will take place may be pre-stored in APE (say, in a database of critical IP addresses), or can be provisioned on a per-flow basis upon a request from the user. APE performs several tasks:

It determines an anonymous path between a source IP and destination IP. These paths are dynamically altered between the ingress and egress switches. Please note that we assume that both the source and destination are in our SDN network and the ingress switch is the switch that is directly connected to source host (and hence must be part of any route originating from the source), whereas the egress switch is the one directly attached to the destination host (and hence must be part of any route terminating at the destination). Here, we also assume that there are multiple paths available between the ingress and egress switches. Otherwise, of course, the path remains static. If source is in the SDN network and the destination is out of the SDN network (e.g. somewhere on the Internet) the egress node will be the last node the flow leaves the SDN network.

It determines the fake IP addresses from a reserved fake IP address pool corresponding to actual source IP and destination IP.

It manages the reserved fake IP address pool by assigning addresses, and making them available when they are returned to the pool after the communications session is completed.

It sends the anonymous path instructions to SDN controller. In turn, SDN controller sends corresponding OpenFlow (see paper to McKeown et al. titled, "OpenFlow: Enabling innovation in campus networks," ACM SIGCOMM Computer Communication Review, 38(2), April 2008, pp. 69-74) (or any control protocol) messages to the network switches along the selected anonymous path for proper header processing and forwarding of packets of the flow.

APE is attached to the SDN controller through its secure northbound API. APE is assumed to be a secure application that has a low probability of being compromised just like the controller. Both APE and the SDN controller will be behind an access control mechanism. In another embodiment, APE may be an integrated function of the SDN controller.

The switches on the anonymous path are programmed by the SDN controller to recognize the fake addresses and forward the incoming packets towards the correct destination address using the path selected by APE. In order to increase the level of obfuscation, the path of communications and the fake IP addresses are altered frequently.

With Initial Source-to-APE dialog: Before an anonymous path is established, a dialog between the source and APE is established. APE may provide, for example, a web interface through which source may enter the properties of the path (i.e., desirable QoS (such as latency), start and stop times of the anonymous path, and the desired level of obfuscation, etc.). When the request from the source is deemed to be acceptable by APE based on availability of network resources and the authority of the requestor, APE sends a response with acceptance of the requested anonymous path after it ensures the set up process is finished successfully. Anonymous path request can also be sent to APE in the form of an ordinary DNS look up message.

Without Initial Source-to-APE dialog: Before an anonymous path is established, a dialog between the source and APE may not be necessary. Anonymous path(s) between certain authorized source and destination pairs may be active for all times and pre-provisioned into APE (e.g., for users of defense department). The routes of such paths and the corresponding fake IPs may be periodically modified just to keep the overall scheme dynamic. In such a scenario, the source can start an anonymous dialog with the destination at any time. The source and destination address translation to fake IP addresses will be done within the switches without requiring any action from the source, and will be completely transparent to both source and destination hosts.

The anonymous path operations can be performed in various ways. We outlined just two exemplary methods below, but many other variations can easily be derived.

Method-I (Static Route):

When the data packet originating from the source arrives at the ingress (first) switch on the anonymous path, that switch would be responsible to (i) change header of each packet of the flow to swap the addresses of source and destination with the fake addresses selected by APE, and (ii) forward the packet to the next hop switch along the anonymous path. Any intermediate switch (any network switch between the ingress and egress switches) on the anonymous path would be responsible only to forward packets to the next hop switch by looking-up the flow instructions associated with the fake destination address. When the data packet originating from the source arrives at the egress (last) switch on the anonymous path, however, that switch would be responsible to (i) change header of each packet to swap the fake destination address selected by APE with the actual destination address (while the source address may or may not be kept as the fake IP depending on the application type), and (ii) forward the packet to the actual destination. The reverse flow would apply in a two-way communication wherein destination and source would interchange.

Method-II (Route Hopping):

In this method, each route and the corresponding source and destination fake-IP address pair has a Time To Live (TTL). If communications are still continuing after the TTL expires, the traffic is switched to a new route to achieve route hopping (if such an alternative route is available). Note that the ingress and egress switches are always on in each new route, but intermediate switches must be different. The selection of new intermediate switches takes into consideration the QoS requirements of the requested path. The fake IPs associated with the old route are immediately returned into the fake IP address pool and their states are changed to "unassigned". New fake IP addresses are assigned along with the new route. The controller first removes all stale flow table entries from the switches of the old route. Thereafter, it sends fresh flow table entries to the switches along the path of the new route. The ingress switch will change header of each packet to swap the addresses of source and destination with the new fake addresses selected by APE, and (ii) forward the packet to the next hop switch along the new anonymous path. Any intermediate switch (any switch between the ingress and egress switches) on the anonymous path would be responsible to simply forward packets to the next hop switch by looking-up the flow instructions associated with the fake destination address. When the data packet originating from the source arrives at the egress (last) switch on the anonymous path, that switch would be responsible to (i) change header of each packet to swap the new fake destination address selected by APE with the actual destination address (while the source address may be kept as the fake IP or can also be swapped to its real IP depending on application type), and (ii) forward the packet to actual destination. The reverse flow would apply in the two-way communications wherein destination and source would interchange. Once the timer for the route expires, APE requests provisioning of a new route.

Although the address swapping is performed only at the ingress and egress switches in both static route and route hopping methods, we may elect to perform address swapping at each switching hop by translating an incoming packet to an outgoing packet with a different set of fake IP addresses for source and destination. In another embodiment, we may elect to only swap the destination addresses to fake IP and leave the source address intact. Yet in another embodiment, the source address may remain as fake up to the destination. In this particular scenario, the destination will not know the actual source IP, but if it sends packets in the reverse direction, i.e., towards the fake source, the switches along the anonymous path will know where to forward these packets to reach the real source.

The enabler of real IP address swap to fake IP addresses is the capabilities provided on the interface between SDN controller and switches such as OpenFlow.

According to FIG. 1 below, there are a number of OpenFlow rules that trigger switch actions. For example, a rule that we use to implement address swapping is as follows:

RULE: If IP source address=Real-IP(s) & IP destination address=Real-IP(d)
ACTION: Modify header: destination IP address=Fake-IP(d)

Fake IP Address Pool:

One of the aspects of this invention is the implementation of fake IP addresses for obfuscation. APE keeps a reserved pool of unused IP addresses that are unassigned to any network component. A fake IP address is assigned as a destination or source address temporarily and once the flow is completed, it becomes available to be assigned to another end point. It is of paramount importance that these addresses are not used elsewhere in the network to prevent routing anomalies. FIG. 4 shows an exemplary fake IP pool, and the states of IP addresses in the pool.

The switches on the prepared secure path are only given the necessary instructions to forward the packets to the next hop so that each switch has the knowledge of only the previous hop and next hop, just as in onion routing. However, in the proposed method, unlike onion routing, encryption/decryption is not needed for anonymous communications. Thus, the invention brings the anonymity concept into an SDN in a much more efficient and faster way than the legacy methods. Furthermore, it requires no further extension in the current SDN communication protocols and no new capabilities on the hosts.

FIG. 2 illustrates an exemplifying scenario of a data flow between source IP address, Real-IP(s) 101, and destination IP address, Real-IP(d) 102. The normal flow path 207 that SDN controller 1000 selects is via switches X1 201-Y1 203-Z1 202, wherein X1 201 is the ingress, Y1 203 is the intermediate switch and Z1 202 is the egress switch. The flow path is communicated to X1, Y1 and Z1 by the SDN controller via OpenFlow protocol.

Figure 3:
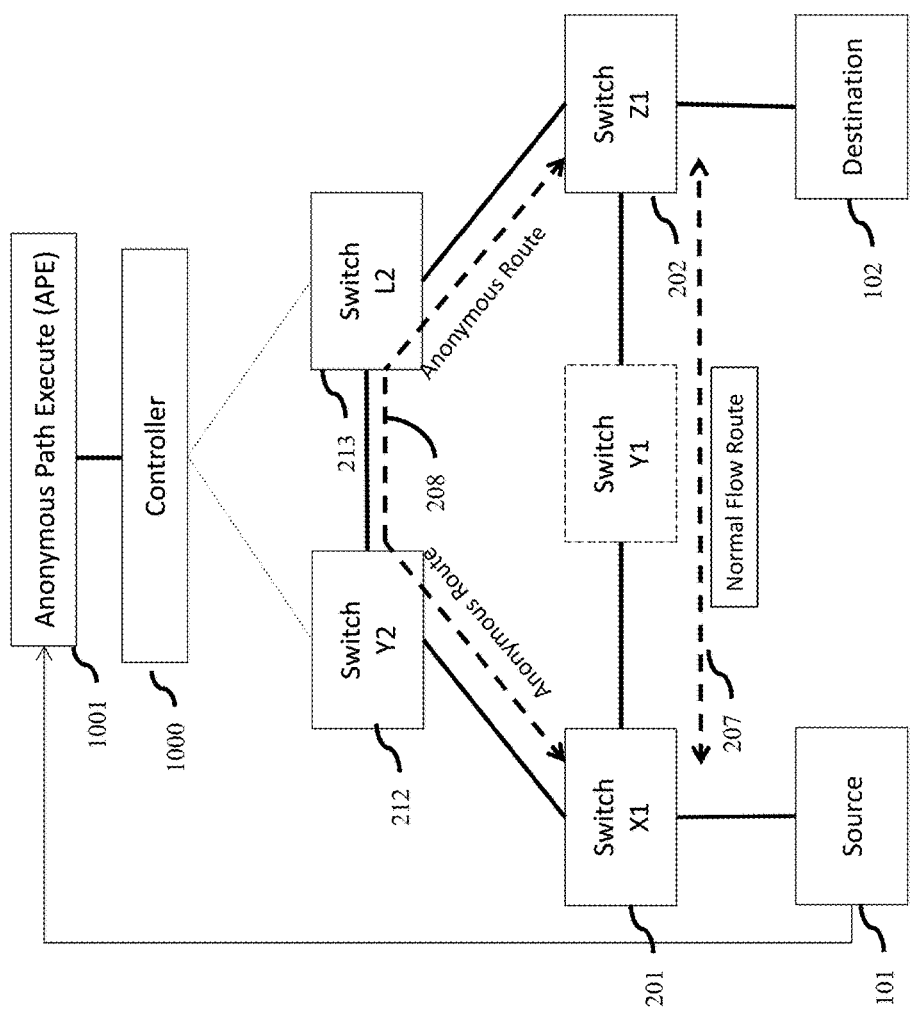
FIG. 3 depicts a diagram of the SDN network with APE and controller.

FIG. 3 illustrates an exemplary scenario of a data flow between source IP address Real-IP(s) and destination IP address Real-IP(d) obfuscated by fake IP addresses and an anonymous path that APE selects. The anonymous flow path 208 is via switches X1 201-Y2 212-L2 213-Z1 202, wherein X1 201 is the ingress, Y2 212 and L2 213 are the intermediate and Z1 202 is the egress switch. The flow path 208 is communicated to X1 201, Y2 212, L2 213 and Z1 202 by the SDN controller 1000 via, for example, the OpenFlow protocol.

Note that in this process, Anonymous Path Execute (APE) 1001 instructs the SDN controller 1000 (i) by sending source and destination fake IPs (although in some scenarios source IP address may not need to be obfuscated); and (ii) the anonymous flow path for packet forwarding. Given fake IPs are selected from the Fake IP Address Pool and were not in use before, there were no flow table entries associated with the selected fake IP addresses in the switches (therefore there is nothing to erase in the switch associated with that address).

In Method-I (static route), SDN controller sends appropriate instructions to switches X1, Y2, L2 and Z1. Switches X1 and Z1 perform IP address swapping in addition to packet forwarding, while Y2 and L2 perform only packet forwarding as follows:

X1: swap source IP Real-IP(s) to Fake-IP(s);
    swap dest IP Real-IP(d) to Fake-IP(d);
    forward packets with Fake-IP(d) to Y2
Y2: forward packets with Fake-IP(d) to L2
L2: forward packets with Fake-IP(d) to Z1
Z1: swap Fake-IP(d) with Real-IP(d);
    forward Real-IP(d) to the destination host.

Figure 6:
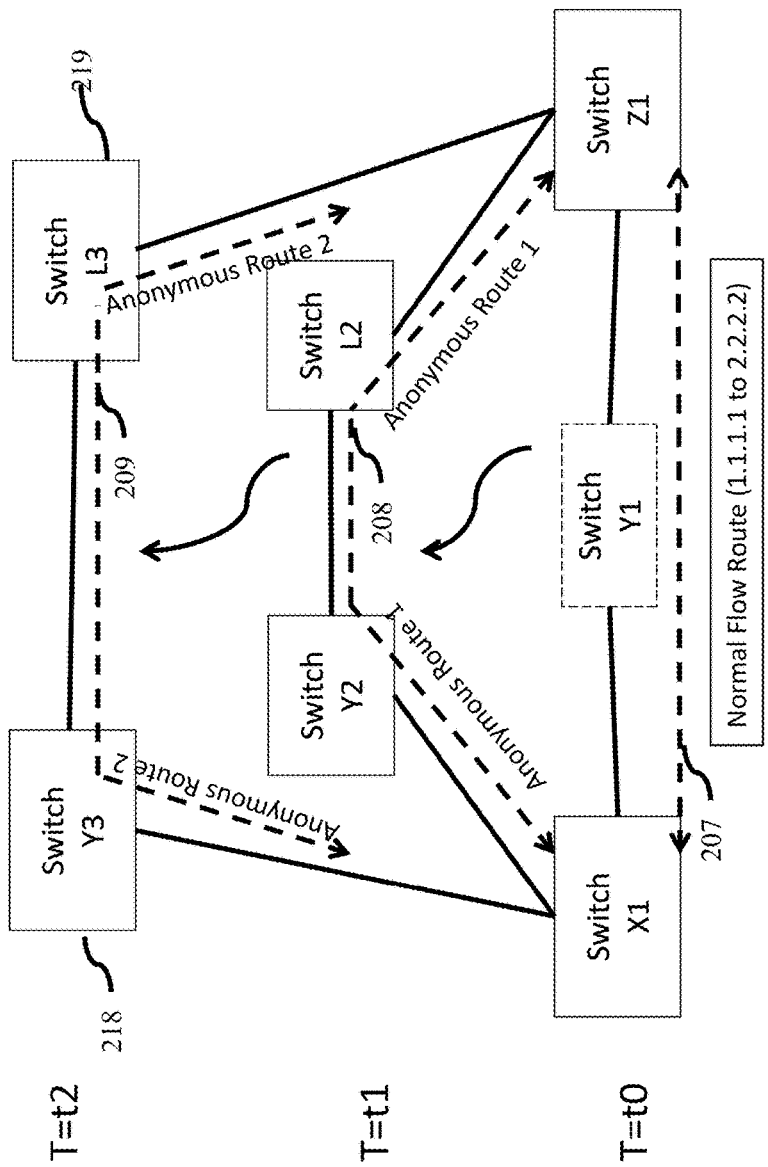
FIG. 6 illustrates three alternative paths between source and destination.

In Method-II (route hopping and intermediate switch address randomization), According to FIG. 6, switches are configured with a new anonymous path 209 via X1-Y3 218-L3 219-Z1, and furthermore, X1, Y3, L3, and Z1 perform both IP address swapping and packet forwarding to next hop. We have chosen the new path of X1-Y3 218-L3 219-Z1 after the TTL expires for X1-Y2-L2-Z1 (i.e., path 208):

X1: swap source IP Real-IP(s) to Fake-IP(s);
    swap dest IP Real-IP(d) to Fake-IP(d);
    forward packets with Fake-IP(d) to Y3
Y3: swap source IP Fake-IP1(s) to Fake-IP2(s);
    swap dest IP Fake-IP(d) to Fake-IP1(d);
    forward packets with Fake-IP1(d) to L3
L3: swap source IP Fake-IP1(s) to Fake-I2P(s);
    swap dest IP Fake-IP1(d) to Fake-I2P(d);
    forward packets with Fake-I2P(d) to Z1
Z1: swap Fake-IP2(d) with Real-IP(d);
    forward Real-IP(d) to the destination host Anonymous Path Database:

APE stores the anonymous paths that are live and in the planning. An exemplary database of anonymous flows is illustrated in FIG. 5 where the first flow is active and set up between X1, Y2, L2 and Z1. The second flow is reserved, but not active yet. Note that the fake IP addresses that are in use or reserved are also stored in this database. As soon as an anonymous path is released, the fake IPs used for this path are also released and returned to Fake IP Address Pool. In determining the anonymous path routes, APE collaborates with the SDN controller to gather the topology of the data network and determines the availability of resources on network links to fulfill as request. This information is obtained from the SDN controller periodically or on a request-response basis.

SDN is a new approach for IP networking that allows decoupling of control and data planes. Decisions about traffic routing are performed at the control plane, while traffic forwarding according to the rules determined by the control plane is performed at the data plane. An SDN controller (see paper to Gude et al titled, "NOX: towards an operating system for networks," ACM SIGCOMM Computer Communication Review, 38(3), July 2008, pp. 105-110, and the paper to Lantz et al. titled, "A network in a laptop: rapid prototyping for software-defined networks," In Proceedings of the Ninth ACM, 2010) is the software where control plane decisions are performed. It may reside in a single computer or may be distributed to many computers. SDN applications are written in or on the SDN controller, which enables management of data plan routes differently based on specific application needs.

SDN controller is a logically centralized entity in charge of (i) translating the requirements from the SDN application down to the data path and (ii) providing applications with a summarized view of the network (which may include statistics and events). It is mainly comprised of a control logic, a control to data-plane interface, and an API set for applications to use or program the SDN controller.

The SDN data plane is where forwarding and data processing is performed. A data plane entity is a so called forwarder, which contains one or more traffic forwarding engines with traffic processing functions, an interface to the SDN controller to receive control decisions and to send measurements and statistics on the data plane.

The SDN control-to-data is the interface defined between an SDN controller and a forwarder, which provides at least (i) programmatic control of all forwarding operations, (ii) capabilities advertisement, (iii) statistics reporting, and (iv) event notification. SDN requires a method for the control plane to communicate with the data plane. One such mechanism is OpenFlow, defined by the Open Networking Foundation (ONF) which is often misunderstood to be equivalent to SDN, but other mechanisms/protocols could also fit into the concept. Therefore, this patent application is not reliant on the OpenFlow protocol.

SDN controller also has a northbound interface towards SDN applications and typically provides abstract network views and enables direct expression of network behavior and requirements. This is a possible interface to use, although other implementations are also viable.

For the purposes of this invention, a prior art SDN domain is comprised of a controller, and many switches controlled by said controller. The controller has a northbound interface to the Anonymous Path Application (APE).

Before starting the intended anonymous communications the source connects to APE through a secure channel and requests for an anonymous path set up to a destination address. In order to ease the client side preparations the request could be made in the form of an ordinary DNS look up. The source host may replace the address of its DNS server with that of APE, and sends a DNS query to for the destination to which it wishes to connect anonymously. DNS APE returns a fake IP address for the destination. This ensures at the access (between the source host and ingress switch) the data packets arrive with a fake IP address as a protection for a compromise at the access network.

APE evaluates anonymous path requests according to the conditions set by the network administrator. If it approves a request, APE sends anonymous path set up instructions to the SDN controller. The controller programs the switches on the path accordingly. When the anonymous path is set up successfully, the SDN controller returns an OK message to APE. Multiple routes may be selected for a communication with short TTLs and implemented for the single critical data flow when a TTL of a previous route expires.

The switches on the path will recognize the fake IP and forward the data packets coming from the source to the correct destination. The fake IP address will be produced by APE, before sending the anonymous path set up instructions to the SDN controller In this architecture, even the destination may not need to know the real IP of the source. If the source address is swapped with a fake IP on the forward path, on the reverse path, the destination will answer to that fake IP, and each switch on the reverse path will replace the source and destination IP addresses with fake IPs until the packets coming from the destination address are delivered to the real source.

Figure 7A:
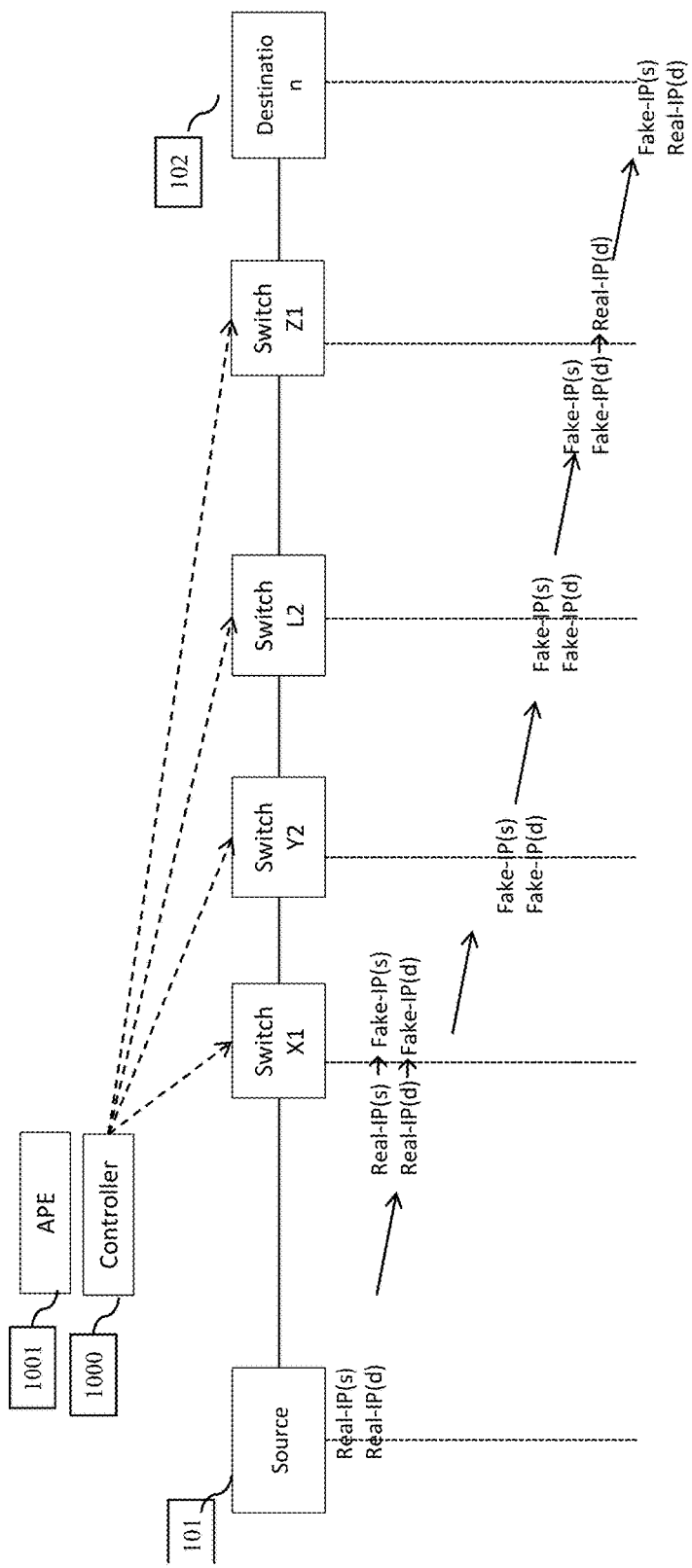
FIG. 7a illustrates IP address randomization scenario I.

FIGS. 7a, b and c enumerate three different exemplary fake IP address assignment scenarios:

Scenario-I (without an APE client): FIG. 7a illustrates an anonymous path construction between source and destination where there is not a client application used at the source. Switch X1 is the ingress, Switch Z1 is the egress and Switches Y2 and L2 are intermediate switches along the anonymous path. In this scenario, after the source makes a request for an anonymous path towards the destination using the web interface of APE 1001, APE 1001 instructs Controller 1000 to install Fake-IP(s) to replace Real-IP(s) of source, and Fake-IP(d) to replace Real-IP(d) of destination. Ingress switch is instructed to perform translation of both source and destination addresses to their Fake values. Intermediate switches are instructed to transparently pass the packets without changing the fake IP addresses. Egress switch replaces at least the destination fake IP with the real IP before sending the packet to destination. It may or may not replace the source IP, since the switches along the path know how to route a packet with a fake IP for the source, up to switch X1 at which the address must be translated back to real source IP. A variation of this scenario is one in which each intermediate switch is also translating the fake IP addresses of IP packets to another set of fake IP addresses (for source and destination) until the egress switch. This variation requires a larger set of fake IP address utilization, which may not be feasible.

Figure 7B:
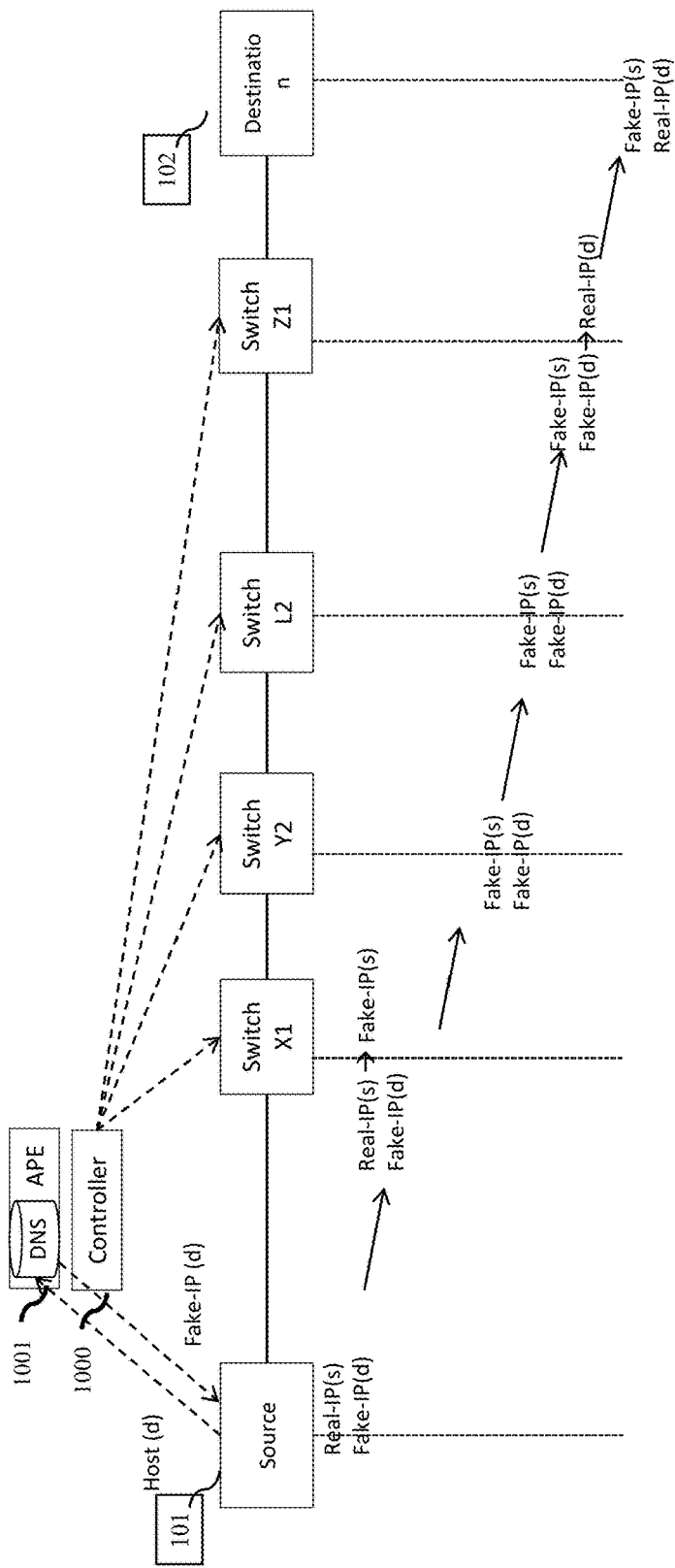
FIG. 7b illustrates IP address randomization scenario II.

Scenario-II (use of APE as DNS): FIG. 7b illustrates an anonymous path between source and destination wherein Switch X1 is the ingress, Switch Z1 is the egress and Switches Y2 and L2 are intermediate switches. The source host is now using APE as the DNS server to reach a specific destination via an anonymous path (this will be configured into the clients network settings). Note that it uses the usual DNS server to reach all other destinations. APE-DNS server returns Fake-IP(d) for hostname(d) instead of Real-IP(d).

APE 1001 instructs Controller 1000 to install Fake-IP(s) of source, and Fake-IP(d) for destination. Ingress switch is instructed to translate only source address to it's fake value. Intermediate switches transparently pass the packets without changing the IP addresses. Egress switch replaces at least the destination fake IP with the real IP. It may or may not replace the source IP since switches know how to route a packet with a fake IP towards source, up to switch X1 at which the address must be translated to real source IP. A variation of this scenario is one in which each intermediate switch is also translating the fake IP addresses of IP packets to another set of fake IP addresses (for source and destination) until the egress switch. This variation of course requires more fake IP utilization.

Figure 7C:
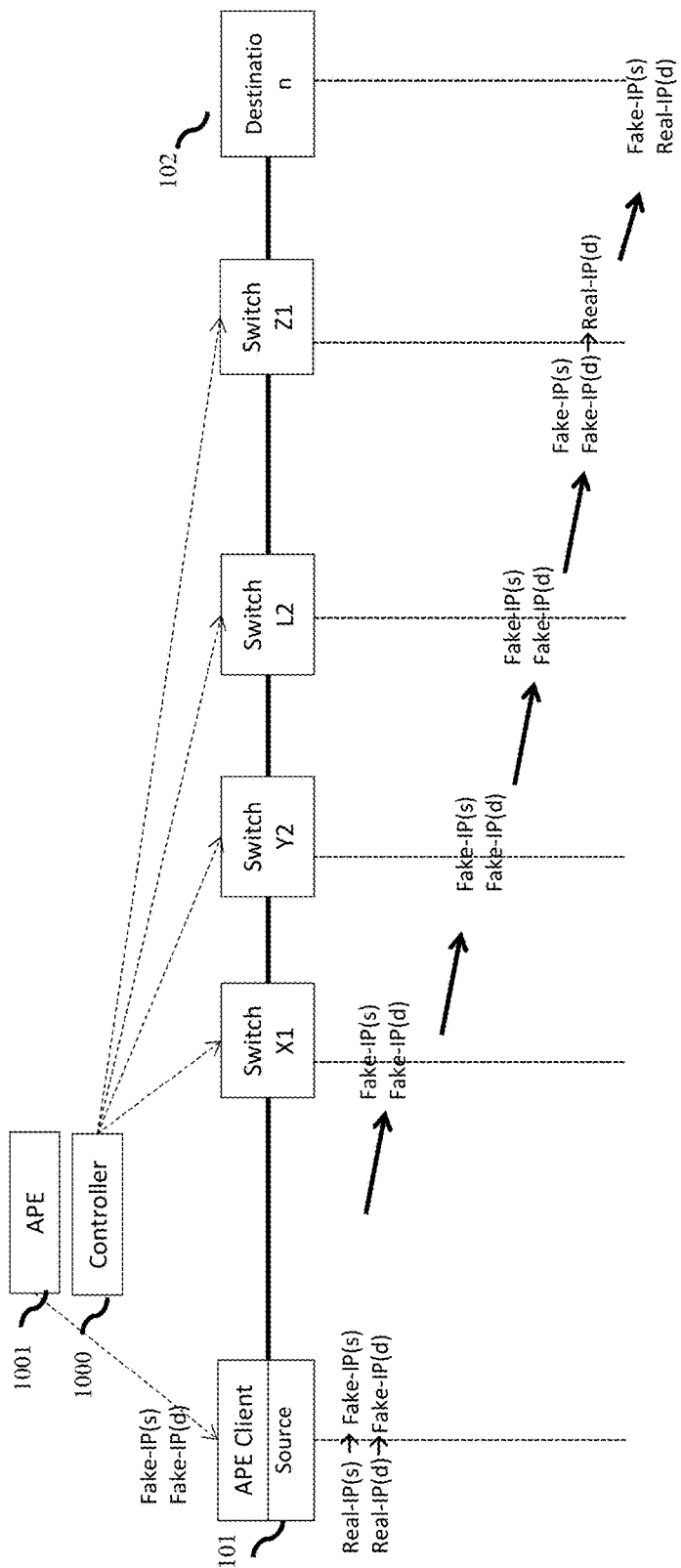
FIG. 7c illustrates IP address randomization scenario III.

Scenario-Ill (use APE client): FIG. 7c illustrates an anonymous path between source and destination wherein Switch X1 is the ingress, Switch Z1 is the egress and Switches Y2 and L2 are intermediate switches. The source has a special client called APE-client. The source is now using APE client to request fake IP addresses for both source and destination. APE (server) returns Fake-IP(s) and Fake-IP(d) which the source host uses to construct IP packets. APE 1001 instructs Controller 1000 to install Fake-IP(s) of source, and Fake-IP(d) for destination. Ingress switch does not need to perform any address translations in this scenario. Ingress and intermediate switches transparently pass the packets without changing the IP addresses. Egress switch Z1 replaces at least the destination fake IP with the real IP. It may or may not replace the source IP since switches know how to route a packet with a fake IP towards source, up to switch X1 at which the address must be translated to real source IP. A variation of this scenario is one in which each intermediate switch is also translating the fake IP addresses of IP packets to another set of fake IP addresses (for source and destination) until the egress switch. This variation of course requires more fake IP utilization.

When the anonymous path is no longer needed (i) either the source will send a cancel message to APE, or (ii) APE will be provided information by the SDN controller that there are no more packet activities on the flow. APE will send anonymous path cancel instructions to the SDN controller and will inform the client when the cancel process is completed.

As an alternative, source host can send an ordinary reverse DNS look up query to APE-DNS with Fake-IP(d), which is interpreted by APE as a cancellation request of anonymous path. This is an optional feature.

The system of invention doesn't need a software installation at the client side. It doesn't use time consuming and bothersome encryption/decryption mechanisms of onion routing in order to provide anonymity. It neither requires dedicated switches for this purpose. Regular switches controlled by the SDN controller can be put into use. The methods used by the invention make efficient use of network resources complying with the philosophy of the SDN paradigm.

Figure 8:
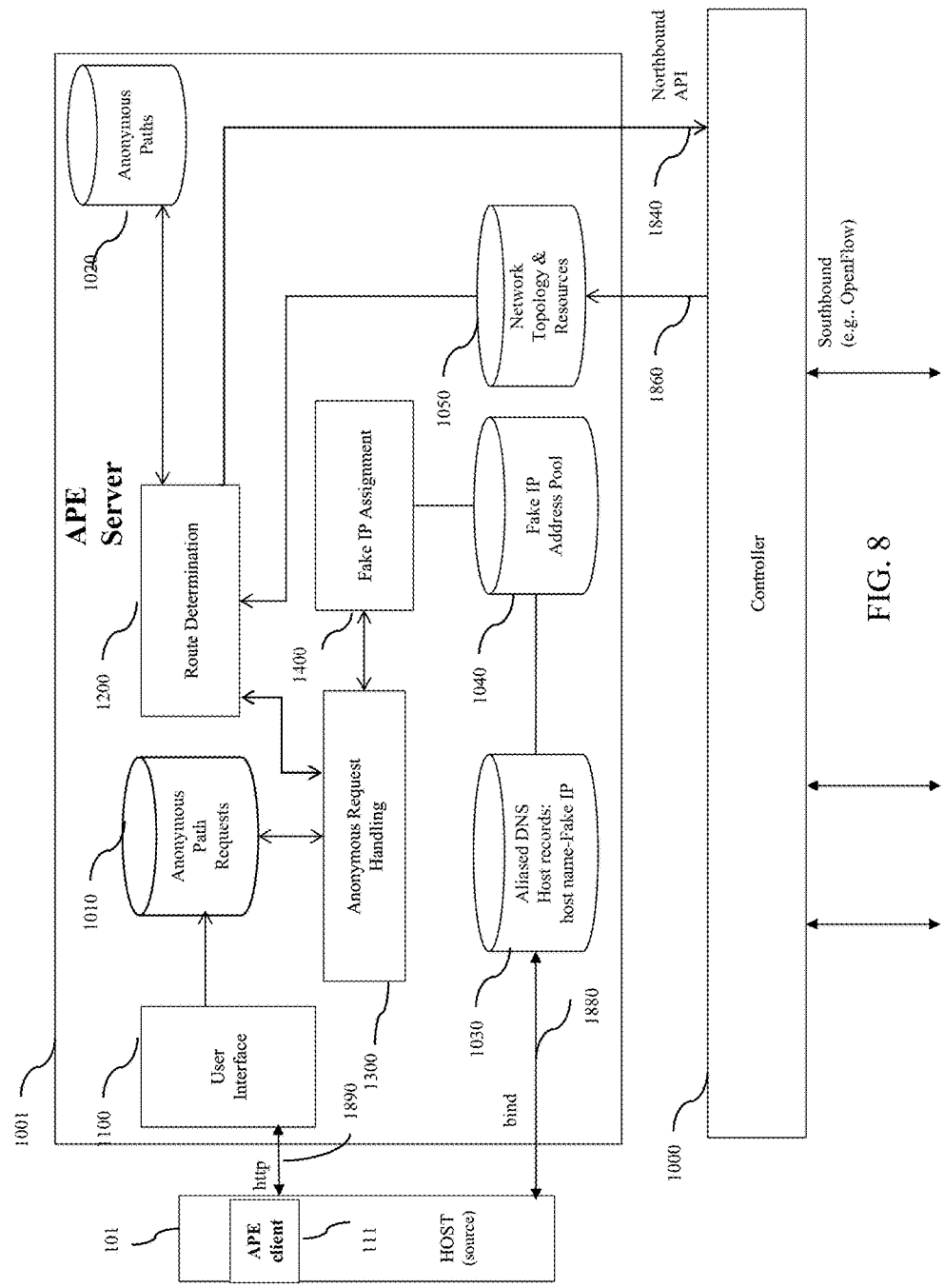
FIG. 8 illustrates high-level system diagram of APE.

An exemplary high-level system block diagram of APE is shown in FIG. 8. APE provides interface to host (source and/or destination) via, possibly, web interface 1890. If APE runs an internal DNS (scenario II above), it also allows hosts to send Bind (a popular DNS software) requests on interface 1880. An authorized host can enter an anonymous path request (destination host's URL, start and stop times, QoS requirements, etc.) User Interface 1100. The anonymous path request is stored in database 1010. Such requests have associated status information (pending, active, successful termination, faulty termination, etc.) as well as path and fake IP information for active paths.

When a path request is ready for realization (i.e., approaching start time), Anonymous Request Handling 1300 fetches the request from DB 1010, and requests Route Determination 1200 to calculate a route between source and destination. Meanwhile, APE periodically obtains SDN's data network topology and resource availability from controller 1000 along northbound interface 1860. Route determination 1200 calculates best anonymous route path(s) evaluating information network data obtained from database 1050, and stores path's route in Anonymous Paths 1020. Each request will have a set of multiple paths, and each path in the set will have a short Time To Live (TTL), if route hopping technique is used. Otherwise, only one static path will be determined without an associated TTL. Parallel to path determination, Anonymous Request Handling 1300 communicates with Fake IP Assignment 1400 to provide unassigned Fake IP addresses from Fake IP Address Pool 1040 to assign to the source and destination along the selected route path.

Finally, anonymous Request Handling pieces together the route path from Anonymous Paths DB 1020 and fake IP addresses from Fake IP Address Pool DB 1040 and updates Anonymous Path Request Database with the path(s) complete information. Simultaneously, it constructs on interface 1840 appropriate messages to Controller 1000 with the path and address information so that Controller 1000 can construct control (e.g., OpenFlow) messages towards the switches along the data path for implementation.

Figure 9:
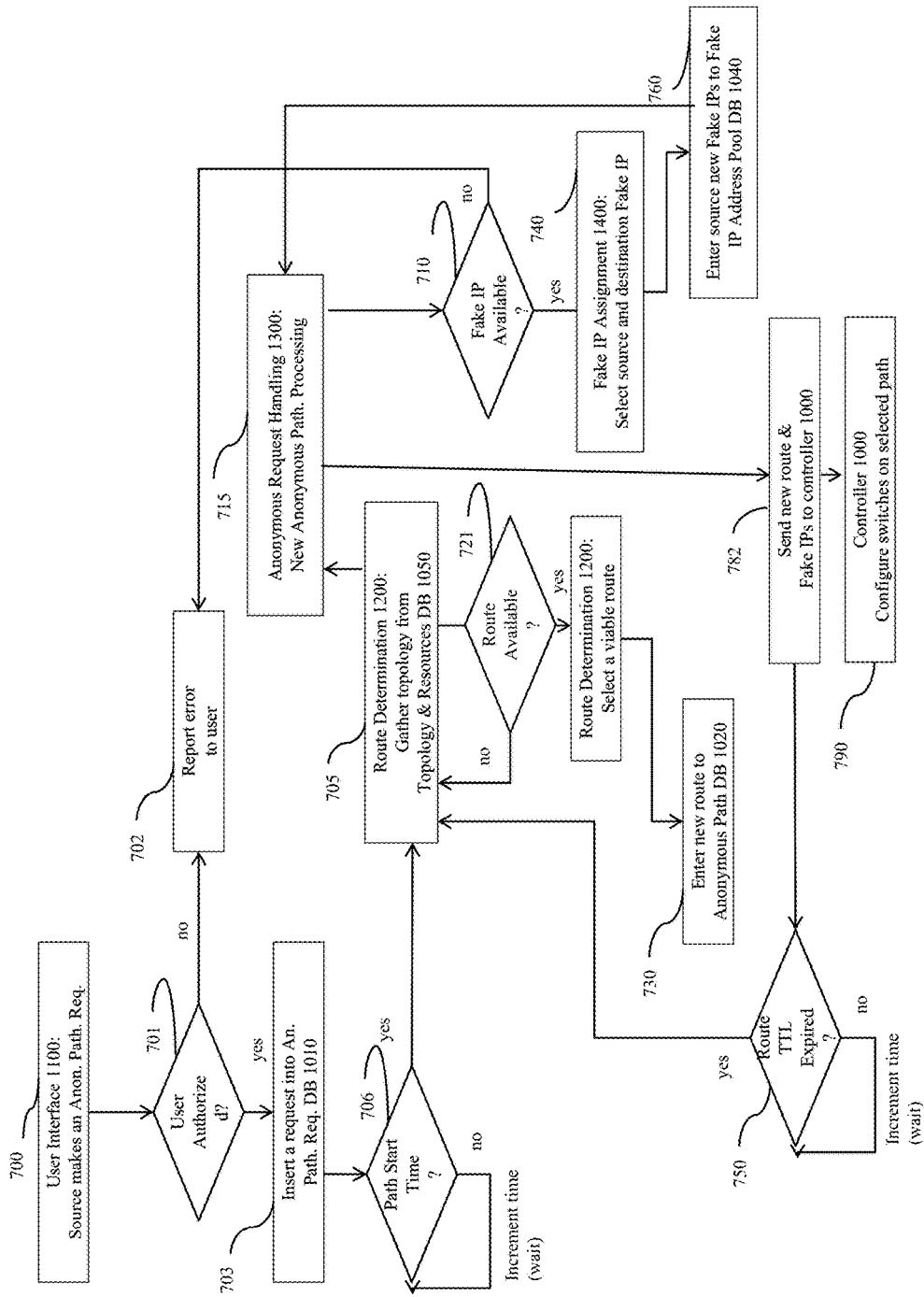
FIG. 9 depicts a flowchart of setting up an anonymous path according to scenario I.

An exemplary flow-chart of Method-II (route hopping) combined with Scenario I (without an APE client for fake IP address assignment) is illustrated in FIG. 9. Likewise, combining Methods-I or -II for route handling, with Scenarios I, II or III for fake IP address handling, generates six different operations for anonymous path provisioning. We haven't covered each case one by one as it is trivial for the one skilled in art once the scenario in FIG. 9 is understood.

User (source) enters an anonymous path request towards a specific destination through interface 1100 in step 700. The system checks to determine if user is authorized in checkbox 701. If said user is authorized, in step 703, said request is entered into Anonymous Path Request DB 1010. Otherwise, an error is returned to said user in step 702. In step 706, the system continuously checks to determine if the said path's start time is approaching. If not, the system stays in a waiting state. Otherwise, in step b, Route Determination 1200 gathers topology and network resources information from Controller 1000. If a viable route is available in step 721, it is sent to Anonymous Path Handling 1300 in step 715, and meanwhile entered into anonymous path DB 1010 in step 730. Multiple paths with short TTLs are selected and entered into 1010.

In step 710, fake IP address availability is checked. If available, these addresses are assigned in step 740, and in step 760, the states of said selected fake IP addresses are changed to 'assigned' in Fake IP Address Pool DB 1040.

Anonymous Request Handling 715 gather route information from Anonymous Path DB along with associated fake IP addresses, and sends them to controller 1000 in step 782. Controller 1000 in turn sends appropriate messages to switches along selected path in step 790.

Short-lived obfuscated anonymous communications paths are established by exploiting software-defined network (SDN)'s unique properties of centralized knowledge of entire network topology, routes and resources, and its ability to instruct data plane switches to quickly alter routes and swap IP addresses. The software application described in this invention is an add-on to SDN controller which determines short-lived routes from a feasible route-set and new fake IP addresses from a reserved address pool for the source and destination hosts to establish anonymity. It provisions only the switches along the route with rules so that a switch can forward packets of the anonymous communications data flow to another switch without needing to know the actual IP addresses of the communicating endpoints, and hence, providing strict anonymity even when the switches are compromised. The method of this invention has superiority over onion routing and TOR routing because it eliminates cumbersome onion-like layering of packets and the last leg vulnerability.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In one embodiment, the present invention provides a non-transitory, computer accessible memory medium storing program instructions for performing a method to establish an anonymous path between a source and a destination in a software defined network (SDN) controller, wherein the program instructions are executable by a processor to: identify a route for the anonymous path between the source and the destination, the route having an ingress switch associated with the source and an egress switch associated with the destination, and the route valid for a pre-determined time defined by a time to live (TTL) value; identify a fake source address for the source and a fake destination address for the destination; send instructions to the ingress switch to utilize the fake source address as the source IP address for the pre-determined time defined by the TTL value and sending instructions to the egress switch to utilize the fake destination address as the destination IP address for the pre-determined time defined by the TTL value, and wherein, for the pre-determined time period defined by the TTL value, the source and the destination communicate anonymously via the route by forwarding packets of data from the ingress switch to the egress switch based on the fake source address and fake destination address.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method has been shown in the above embodiments for the effective implementation of anonymous communication in Software Defined Networks (SDNs) via route hopping and IP address randomization. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method to establish an anonymous path between a source and a destination of data in a software defined network (SDN) controller comprising:
    identifying a route for the anonymous path between the source and the destination, the route having an ingress switch associated with the source and an egress switch associated with the destination, and the route valid for a pre-determined time defined by a time to live (TTL) value;
    identifying a fake source address for the source and a fake destination address for the destination;
    sending instructions to the ingress switch to utilize the fake source address as the source IP address for the pre-determined time defined by the TTL value and sending instructions to the egress switch to utilize the fake destination address as the destination IP address for the pre-determined time defined by the TTL value, and
    wherein, for the pre-determined time period defined by the TTL value, the source and the destination communicate anonymously via the route by forwarding packets of data from the ingress switch to the egress switch based on the fake source address and fake destination address.

2. The method of claim 1, wherein after expiration of the pre-determined time period defined by the TTL value, the ingress and egress switches revert back to their IP addresses assigned prior to the start of the pre-determined time period.

3. The method of claim 1, wherein after expiration of the pre-determined time period defined by the TTL value, a new route is determined and the ingress switch and egress switch are re-provisioned with instructions for implementing the new route.

4. The method of claim 1, wherein an intermediate switch is located between the ingress switch and the egress switch in the route, and wherein, for the pre-determined time period defined by the TTL value, the source and the destination communicate anonymously via the route by forwarding packets of data from the ingress switch to the intermediate switch, and subsequently to the egress switch based on the fake source address and fake destination address.

5. The method of claim 1, wherein the fake source address and the fake destination address are identified and forwarded to the SDN controller by an application software working in conjunction with the SDN controller.

6. The method of claim 5, wherein the fake destination address is identified based on sending a DNS query to the application by the source.

7. The method of claim 1, wherein the egress node is a last node in the SDN network.

8. The method of claim 1, wherein the fake source address and fake destination address are picked from a set of reserved and unused address blocks.

9. The method of claim 8, wherein the fake source address and fake destination address are picked via any of the following ways: picked based on a round robin scheme or picked randomly.

10. The method of claim 1, wherein the route is utilized exclusively for critical communication.

11. A non-transitory, computer accessible memory medium storing program instructions for performing a method to establish an anonymous path between a source and a destination of data in a software defined network (SDN) controller, wherein the program instructions are executable by a processor to:
    identify a route for the anonymous path between the source and the destination, the route having an ingress switch associated with the source and an egress switch associated with the destination, and the route valid for a pre-determined time defined by a time to live (TTL) value;
    identify a fake source address for the source and a fake destination address for the destination;
    send instructions to the ingress switch to utilize the fake source address as the source IP address for the pre-determined time defined by the TTL value and sending instructions to the egress switch to utilize the fake destination address as the destination IP address for the pre-determined time defined by the TTL value, and
    wherein, for the pre-determined time period defined by the TTL value, the source and the destination communicate anonymously via the route by forwarding packets of data from the ingress switch to the egress switch based on the fake source address and fake destination address.

12. A system to establish an anonymous path between a source and a destination of data in comprising:
    an application software;
    a software defined network (SDN) controller;
    wherein the application software and SDN controller:
        identify a route for the anonymous path between the source and the destination, the route having an ingress switch associated with the source and an egress switch associated with the destination, and the route valid for a pre-determined time defined by a time to live (TTL) value; identify a fake source address for the source and a fake destination address for the destination;
        send instructions to the ingress switch to utilize the fake source address as the source IP address for the pre-determined time defined by the TTL value and sending instructions to the egress switch to utilize the fake destination address as the destination IP address for the pre-determined time defined by the TTL value, and
        wherein, for the pre-determined time period defined by the TTL value, the source and the destination communicate anonymously via the route by forwarding packets of data from the ingress switch to the egress switch based on the fake source address and fake destination address.

13. The system of claim 12, wherein after expiration of the pre-determined time period defined by the TTL value, the ingress and egress switches revert back to their IP addresses assigned prior to the start of the pre-determined time period.

14. The system of claim 12, wherein after expiration of the pre-determined time period defined by the TTL value, a new route is determined and the ingress switch and egress switch are re-provisioned with instructions for implementing the new route.

15. The system of claim 12, wherein an intermediate switch is located between the ingress switch and the egress switch in the route, and wherein, for the pre-determined time period defined by the TTL value, the source and the destination communicate anonymously via the route by forwarding packets of data from the ingress switch to the intermediate switch, and subsequently to the egress switch based on the fake source address and fake destination address.

16. The system of claim 12, wherein the fake source address and the fake destination address are identified and forwarded to the SDN controller by the application software.

17. The system of claim 16, wherein the fake destination address is identified based on sending a DNS query to the application by the source.

18. The system of claim 12, wherein the egress node is a last node in the SDN network.

19. The system of claim 12, wherein the fake source address and fake destination address are picked from a set of reserved and unused address blocks.

20. The system of claim 19, wherein the fake source address and fake destination address are picked via any of the following ways: picked based on a round robin scheme or picked randomly.

21. The system of claim 12, wherein the route is utilized exclusively for critical communication.

* * * * *